United States Patent [19]
Candlin

[11] 3,920,126
[45] Nov. 18, 1975

[54] LOCKABLE BICYCLE RACK

[76] Inventor: Francis T. Candlin, 280 Madison St., Denver, Colo. 80206

[22] Filed: Dec. 26, 1972

[21] Appl. No.: 317,946

[52] U.S. Cl.................................. 211/5; 211/22
[51] Int. Cl.² ........................................ E05B 73/00
[58] Field of Search........... 211/4, 5, 17, 18, 19, 20, 211/21, 22; 70/60, 233, 234, 235

[56] References Cited
UNITED STATES PATENTS

| | | | |
|---|---|---|---|
| 608,464 | 8/1898 | Lewis...................................... | 211/5 |
| 626,535 | 6/1899 | Gradmiller............................. | 211/19 |
| 2,873,034 | 2/1959 | Laing..................................... | 211/17 |
| 3,762,569 | 10/1973 | Spring................................... | 211/5 |

FOREIGN PATENTS OR APPLICATIONS

| | | | |
|---|---|---|---|
| 23,631 | 8/1903 | United Kingdom................... | 211/17 |
| 466,850 | 9/1928 | Germany .............................. | 211/17 |
| 559,043 | 9/1932 | Germany .............................. | 70/234 |
| 25,139 | 6/1951 | Finland................................. | 70/233 |
| 851,826 | 10/1939 | France................................... | 211/5 |
| 759,828 | 5/1967 | Canada.................................. | 211/20 |

Primary Examiner—Marion Parsons, Jr.
Assistant Examiner—Thomas J. Holko
Attorney, Agent, or Firm—John E. Reilly; Earl C. Hancock

[57] ABSTRACT

A lockable bicycle rack having a pair of anchored upright members for supporting a wheel of the bicycle inserted therein, a pivoted bicycle frame locking member attached to said upright member and disposed to extend over the handlebars of the supported bicycle. A cable attached at one end to said frame locking member is locked through both bicycle wheels and the other end is secured by the lock for the frame lock. Various locking devices can be used for securing the frame locking member and cable to prevent unauthorized removal of the bicycle from the rack.

7 Claims, 5 Drawing Figures

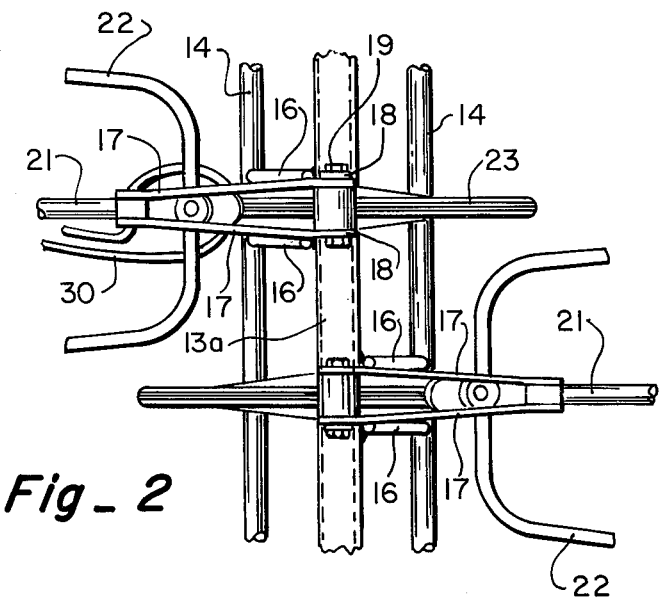
Fig_2
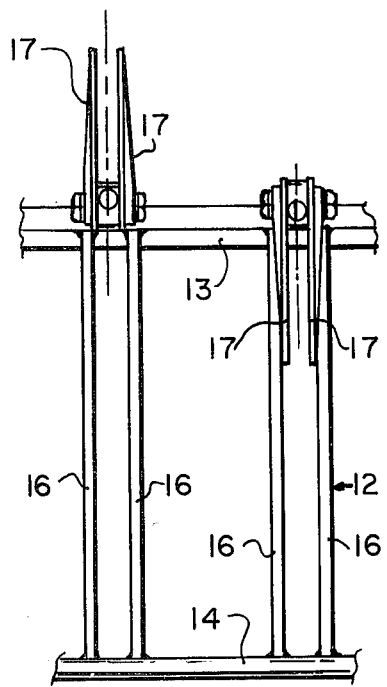
Fig_3
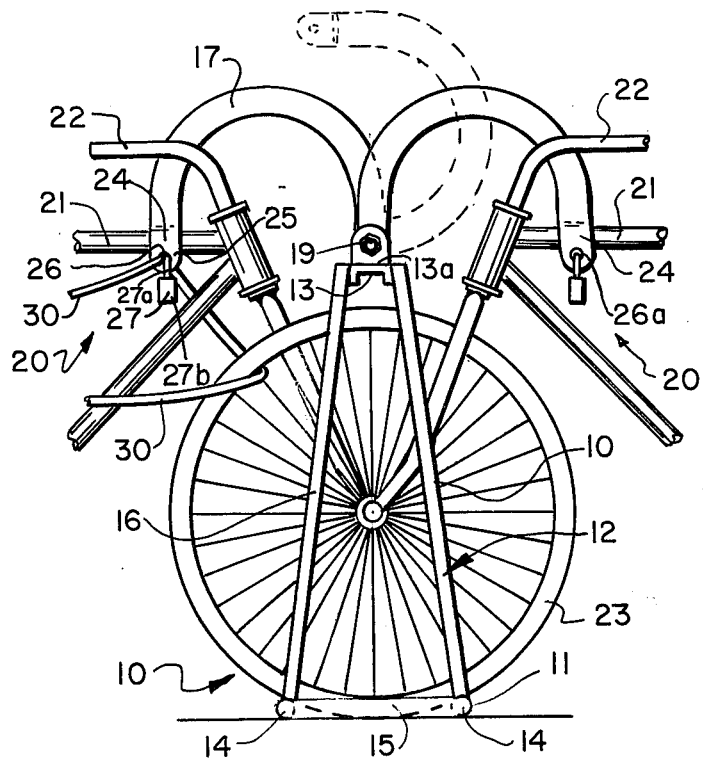
Fig_1

LOCKABLE BICYCLE RACK

The present invention is directed to a bicycle rack which can securely retain a bicycle to prevent its theft. It is more specifically directed to a bicycle rack which holds a bicycle in an upright position and clamps onto the frame and secures both wheels to prevent its unauthorized removal.

A number of locking arrangements purporting to prevent bicycle thefts are available throughout the world. Generally, such locking arrangements include a cable, chain or elongated locking clasp which passes through the spokes of at least one wheel. These devices are made light weight so that the bicycle rider can carry it on the bicycle or on his person. Such locking devices are easily removed by using small bolt cutters, hack saws or the like, and thus do not provide any real deterrent to theft of the bicycle.

As the recent use of bicycles has increased, the theft of bicycles has, also, risen at an alarming rate. Along with this increased use there has been an increase in the ownership of expensive bicycles costing from approximately $150.00 to $600.00. Such expensive bicycles have been a prime target for many thieves of both the amateur and professional types. The amateur takes bicycles that are not locked or locked with easy to cut chains or cables. The professional, however, uses fairly sophisticated tools to remove bicycles that are secured with more elaborate locking units. Usually this type of thief uses a large bolt cutter and an open truck. Apparently the criteria for a prime theft target appears to be that the bike must be freed from its locking device in less than 10 seconds. If it can not be freed within that time, the attempt is usually abandoned to reduce the chances of being caught. In some instances, the thief will take a portion of the bicycle, such as a wheel, when not locked to the bicycle frame by a cable or chain.

It is therefore an important object of the present invention to provide a simple locking arrangement which secures both wheels and frame of the bicycle to an anchored support, such as a rack.

Another object of the present invention is to provide a lockable bicycle rack which securely holds a portion of the bicycle frame and deters removal by a thief.

A further object of this invention is to provide a locking arrangement which includes a cable for securing both wheels and frame of the bicycle to the locking device.

A still further object of this invention is to provide a simple and relatively easy locking device which can be easily used by a person.

A still further object of the present invention is to provide a locking device which can be attached to existing bicycle stands with a minimum of tools.

The rack of the present invention comprises at least one pair of generally parallel upright members extending from a suitable base. This base would desirably be anchored to the sidewalk or other surface to prevent the entire unit from being removed. A top member or elongated bar is attached across the upper ends of the upright members to provide support to the upright members and to enclose the area between the uprights. The spacing between the members is sized so that the wheel of a bicycle may be inserted therein as is well known.

In one form, a pair of arcuate parallel arms are pivotally attached to the top member and arranged to generally coincide with the upright members. These arms are adapted so as to pivot over the handle bars of the bicycle and attach to or straddle the bicycle cross bar or a portion of the frame. Various locking devices can be provided to fasten or secure the outer ends of the arcuate members around the frame to prevent removal of the bicycle from the rack.

In a preferred embodiment a cable is attached to one of the arm members and is interwound through the wheels and frame of the bicycle to also secure these portions. The free end of the cable can be used as a portion of the locking device to prevent removal of the arms from the frame. Other locking devices such as a hasp or the like can be used.

Other features of this invention will appear in the following description and appended claims, reference being made to the accompanying drawings which form a part of the specification wherein like referenced characters designate corresponding parts in the several views.

FIG. 1 is a pictorial, partial side elevation view of bicycles secured in the rack according to the present invention;

FIG. 2 is a top pictorial view of the bicycles shown in FIG. 1, individually secured in the rack;

FIG. 3 is a partial sectional view of the rack securing device with the bicycles removed;

Figure 4:
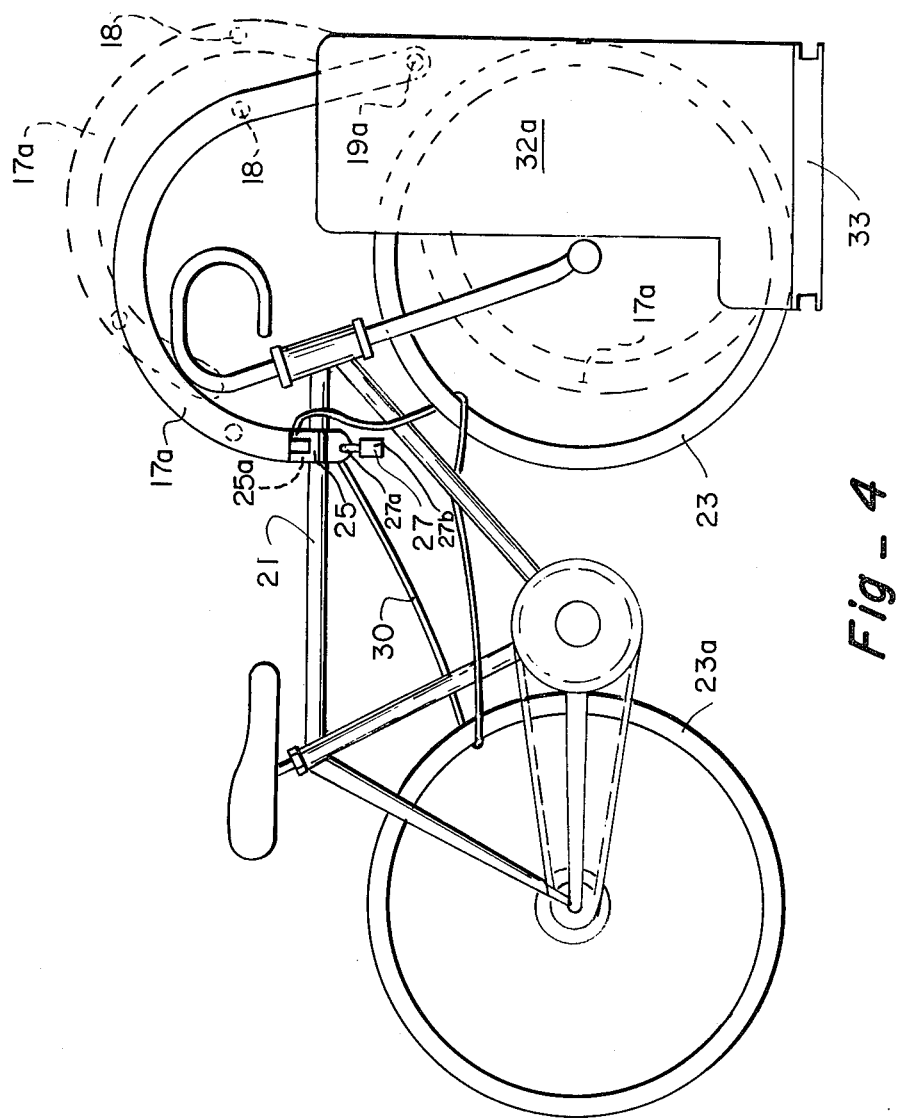
FIG. 4 is a pictorial side elevation view of a bicycle secured in a rack according to another embodiment of the invention.

Referring more specifically to the drawings, FIG. 1 shows a bicycle rack 10 having a bottom support 11, upright members 12 and top member 13. The bottom support 11 is formed by means of parallel bars 14 interconnected by cross bars 15 which are joined together at spaced intervals to form a rigid flat framework. The upright members shown in general by numeral 12 have a plurality of bars or rods 16 arranged to extend upwardly from the bottom support base 11. The bars 16 are arranged in parallel pairs with sufficient spacing to allow insertion of the front wheel of a bicycle.

The top member 13 is arranged to extend in the same general direction and parallel to the bottom support 11. The member 13 joins the top or upper ends of the bars 16 to support the bars and close the upper portion of the opening for the bicycle wheels.

The pairs of upright bars 16 are spaced longitudinally along the rack 10 and alternate from one side to the other so that the bicycles can be supported in an upright alternating fashion. In other words, to provide additional space for the bicycles and to better utilize the space along the rack the bicycles are inserted from each side in alternate fashion so that the individual handle bars will not interfere with the adjacent bicycles.

Pairs of arcuate arms 17 are fabricated from generally flat stock and are joined together at one end. The joined ends are pivotally mounted on pins 19 through upwardly extending ears 13a on the top member 13. These arms are mounted directly over the respective pairs of upright members 12 and are arranged to pivot and extend outwardly from the rack on the side in which the bicycle is to be inserted. The arms 17 are arranged so that the concave inner portion extends upwardly and over the handle bars of the bicycle so that the outwardly extending ends of the arms 17 may straddle and be attached to the cross bar 21 or some other portion of the frame. If desired, a padded cross member (not shown) can be provided between the arms 17 and spaced from the open end to limit the amount of overlap that the arms have with the frame.

A chain 30, of hardened steel, is secured by one end, as by welding or the like to a portion of the rack, and is interwoven through both wheels of the bicycle. The free end of the chain may contain an aperture for securing to a lock 27. The chain may be replaced by a braided cable or the like.

A locking arrangement 24 is provided to pass around the cross bar 21 or frame member to securely hold the bicycle and to prevent its removal from the rack 10. In the embodiment shown in FIG. 5, a hasp type member 25 having a hinge pin 25a is pivotally attached to one of the arcuate arms and includes a hole 26 at its end which corresponds to a similar hole 26a provided in the adjacent arm. A common lock, latch or other fastening device 27 may be passed through the aligned holes to prevent removal of the arms 17 from the frame.

The chain or cable 30, as described above, is interwoven through the frame and both wheels of the bicycle in order to prevent removal of the wheels from the frame. The end of the cable can be provided with an elongated shaft such as the bale 27a of the lock 27 which can be inserted through a pair of aligned holes 26, 26b provided near the ends of the arcuate arms 17 (see FIG. 1). A lockable gripping member 27b is then inserted over the end of the shaft 27a. By passing the elongated shaft 27a through the holes, the bicycle cross bar 21 is retained. In a specific embodiment, FIG. 5, a U-shaped clasp or bale 27a can be attached to the end of the cable 30 which can be inserted through the aligned holes 26. The body of a common bicycle lock 27b could then be inserted over the ends of the clasp 27a to secure the cable and arms.

It is to be understood that any type of suitable material may be used in the fabrication of the arms and rack, such as steel, fiber glass or the like. The chain or cable, which is made from hardened steel or alloys to deter cutting, may be covered with a soft pliable material to prevent scratching of the bicycle frame and wheels.

Figure 5:
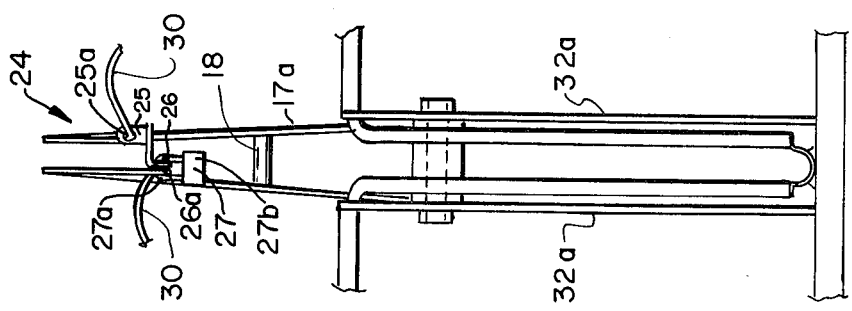
FIG. 5 is a partial pictorial side view of the rack shown in FIG. 4.

As shown in FIGS. 4 and 5, another embodiment of the lockable bicycle rack can be provided which includes the arcuate arm 17a mounted on a rack with side member 32a. The arms are spaced apart by spacers 18. The arms are pivoted by pivot 19a, in a manner similar to that described above, to a frame 32a, which includes a wheel holding space, mounted on a base 33. The arcuate arms 17a are similar to those described as 17 above. The lower pivot permits the arms to extend downwardly for locking the frame of a girl's bike. The chain 30 is woven through wheels 23 and 23a and secured by the lock 27 along with the frame. As shown in FIGS. 4 and 5, the bicycle is inserted into the rack after first raising the arms 17a. The arms are then permitted to extend and straddle a portion of the frame of the bicycle so as to be locked securely around the frame, as described above.

In operating the lockable bicycle rack as described in this invention, the front wheel of the bicycle is inserted through the upright parallel members on the rack. The arcuate arms are held upwardly so as to permit insertion of the bicycle. With the bicycle properly positioned, the arms are allowed to swing downwardly and straddle the cross bar or other portion of the frame of the bicycle. It is primarily intended that the bicycle owner will provide his own lock or fastening device to be used in conjunction with any arrangement provided. Various embodiments can be provided for locking arrangements. Either a conventional bicycle lock can be inserted through aligned holes in each arm or a combination type of key lock can be provided. If desired, the invention described herein can include a locking device which would be chained or secured to the arms to prevent its removal or loss.

The cable is provided so that it is interwoven through as many of the bicycle parts as possible, especially the wheels to prevent their being separately removed from the bicycle. In this way all removable portions of the bicycle can be secured at one time. The free end of the cable is then releasably secured and can serve the dual purpose of providing the fastening device to prevent the arms from being removed from the frame.

While a lockable bicycle rack has been shown and described in detail, it is obvious that this invention is not to be considered as being limited to the exact form disclosed and that changes in detail and construction, especially in the locking devices, may be made therein within the scope of the invention without departing from the spirit thereof.

Having thus set forth and disclosed the nature of this invention, what is claimed is:

1. A lockable bicycle rack for securing a bicycle having a frame and a front and rear wheel attached to said frame, said frame including a cross-bar extending generally between said front and rear wheels, said rack comprising:
   a. base means for supporting the rack on a horizontal surface;
   b. at least one pair of upright members arranged to extend upwardly from said base means, whereby the bicycle may be supported in an upright, horizontal position when at least a wheel of the bicycle is insertd therebetween;
   c. pivotal attaching means having at least one arcuate arm pivotally attached at one end near the top of said upright members so that the free end may be pivoted over the bicycle handle bars to contact the crossbar of the bicycle frame;
   d. lock means for attaching the free end of said arcuate arm to the bicycle crossbar, said lock means includes fastening means provided at the free end of the arcuate arm to secure the arcuate arm to the crossbar of the bicycle; and
   e. cable means permanently afixed at one end to a portion of the rack and the opposite end having an attachment means, said cable means being of a sufficient length to be interwoven through the wheels and frame of the bicycle, and the attachment means of the cable means being arranged to be secured to said lock means to prevent the unauthorized removal of the bicycle or the wheels thereof from said rack.

2. A lockable bicycle rack as defined in claim 1 wherein:
   said pivotal attaching means includes a pair of parallel arcuate arms pivotally attached to said upright members and arranged so that the free ends of said arms can extend outwardly and straddle the crossbar of said bicycle.

3. A lockable bicycle rack as defined in claim 2, wherein:
   said cable attachment means is an elongated member, and said lock means includes means for receiving said cable elongated member and securing said elongated member to prevent the unauthorized removal of the bicycle from the arm and cable means.

4. A lockable bicycle rack as defined in claim 3 wherein said elongated member includes
- a U-shaped member having parallel legs and the end of said cable means being attached to the closed portion of said member;
- at least one leg being arranged to pass through aligned holes positioned through the outward end of said arms; and
- means provided for fastening the legs of said U-shaped member so that the U-shaped member can not be removed from said aligned holes.

5. A lockable bicycle rack as defined in claim 3 wherein said fastening means includes
- aligned holes positioned in the free ends of the outward extending arms whereby the elongated member may be inserted therethrough;
- said elongated member passing under the crossbar of said bicycle to prevent removal of the arms from said crossbar; and
- means for gripping the end of said elongated member to prevent removal of said elongated member from the aligned holes.

6. A lockable bicycle rack as defined in claim 1 wherein said lock means includes
- a hasp means pivotally attached to said arm and a latch means for fastening said hasp means so as to secure the arm to said bicycle.

7. A lockable bicycle rack adapted for securing a bicycle having a frame, front and rear wheels attached to said frame, said frame including a cross bar extending between said front and rear wheels, and a handle bar extending above said front wheel and forwardly of said cross bar, said rack comprising:
- a. base means for supporting the rack on a horizontal surface,
- b. a top member disposed for horizontal extension above and in spaced relation to said base means whereby the front wheel of the bicycle may be inserted in said rack beneath said top member,
- c. pivotal attaching means having at least one arcuate arm with an inner concave surface portion extending the greater length of said arcuate arm, said arcuate arm pivotally attached at one end to said top member for upward extension therefrom so that the free end is pivotal over the handle bars to engage the cross bar of the bicycle with the inner concave surface extending over the handle bars,
- d. lock means for attaching the free end of said arcuate arm to the bicycle cross bar, said lock means includes fastening means provided at the free end of the arcuate arm to secure the arcuate arm to the cross bar of the bicycle, and
- e. cable means permanently affixed at one end to a portion of the rack and the opposite end having an attachment means, said cable means being of a sufficient length to be interwoven through the wheels and frame of the bicycle, and the attachment means of the cable means being arranged to be secured to said lock means to prevent the unauthorized removal of the bicycle or the wheels thereof from said rack.

* * * * *